Jan. 28, 1969 A. C. BROOKS 3,424,061
HYDRAULIC CONTROL CYLINDER AND AIR PISTON ASSEMBLY
Filed Aug. 26, 1965 Sheet 1 of 2

INVENTOR.
ALAN C. BROOKS
BY
ATTORNEY

INVENTOR.
ALAN C. BROOKS
BY Lawrence I. Lerner

ATTORNEY

United States Patent Office 3,424,061
Patented Jan. 28, 1969

3,424,061
HYDRAULIC CONTROL CYLINDER AND
AIR PISTON ASSEMBLY
Alan C. Brooks, 633 Nye Ave., Irvington, N.J. 00711
Continuation-in-part of application Ser. No. 414,917,
Nov. 30, 1964. This application Aug. 26, 1965, Ser.
No. 489,459
U.S. Cl. 92—12    3 Claims
Int. Cl. F15b 15/22

ABSTRACT OF THE DISCLOSURE

An hydraulic cylinder and air piston assembly including an air cylinder, and an hydraulic cylinder coaxial with and axially moveable within the air cylinder. The air piston serves as an end cap of a cylinder filled with hydraulic fluid within which is an hydraulic piston. Hydraulic control means are provided for controlling the flow of hydraulic fluid from one side of the head of the hydraulic piston to the other side. A limit stop is provided to limit the axial travel of the hydraulic piston. The air piston is adapted to be placed within an air cylinder and has its movement controlled in any well known manner. The air piston assembly exhaust allows air in the air cylinder to expand as it is exhausted to cool the hydraulic cylinder surface and thus maintain the hydraulic fluid inside of the hydraulic cylinder at a constant temperature. The hydraulic control means for the hydraulic piston is a poppet valve which allows hydraulic fluid to pass through the hydraulic piston head in a given direction only after the completion of travel of the hydraulic piston and poppet valve assembly. The poppet valve has a variable orifice controlled by rotation of the hydraulic piston rod to vary the poppet valve orifice and thus vary the flow of hydraulic fluid from one side of the hydraulic piston head to the other side thereof.

---

This application is a continuation-in-part of my copending U.S. patent application Ser. No. 414,917, filed Nov. 30, 1964 for "Piston Rod Actuated Internal Metering Flow Control Mechanism."

When compressed air is admitted to a closed cylinder having therein a piston attached to a piston rod operating through one end cap, as soon as pressure within the cylinder is sufficient to overcome internal friction and the inertia of any connected load, the piston rod will move forward at a very high rate of speed unless some means is applied to control it.

To prevent the sudden acceleration of the piston rod and to provide a definite adjustable rate of linear advance of rod and connected load, it has been common practice to attach a means of hydraulic resistance to the air operated rod and connected load. These devices are commonly known to those versed in the art as "hydraulic checks." One such device is the subject of my copending application Ser. No. 414,917, filed Nov. 30, 1964, bearing the title "Piston Rod Actuated Internal Metering Fow Control Mechanism," upon which this application for patent is based.

Two methods of attachment have been employed; mounting the hydraulic control cylinder in line with the air cylinder so that a common piston rod actuates the pistons in both cylinders, and the "piggy-back" arrangement in which the control cylinder is attached to and mounted parallel to the axis of the air cylinder. The piston rod of the control cylinder is connected to the piston rod of the air cylinder by a tie plate and is actuated by the movement of the air cylinder rod.

The first method has the disadvantage of requiring much space since there are two cylinders in line. The longer the stroke the greater this disadvantage becomes. The second method is also unsatisfactory since it is bulky and tends to cock the piston rod of the air cylinder when high hydraulic resistance (checking) is applied.

The most compact and efficient arrangement is to mount the control cylinder inside the air cylinder in such manner that both cylinders are concentric and have the same common axis. This type of arrangement is known to those versed in the art as a coaxial air-hydraulic cylinder. In this arrangement all forces are in line.

It is the prime purpose of this application to show that with a minor change the hydraulic control cylinder of my copending application aforementioned can become the piston rod of an air cylinder in combination with a suitable piston; and that when this assembly of my hydraulic control cylinder and suitable air piston is installed concentrically in any cylindrical cavity of any material capable of sustaining pressure and having suitable end caps with ports for admitting and discharging air under pressure, a coaxial air-hydraulic cylinder has been constructed.

This construction utilizes the control features of my hydraulic control cylinder to provide infinitely adjustable rapid approach length and hydraulic feed rate of the piston rod. These features are fully described in my copending application, Ser. No. 414, 917. Since the control cylinder has no external appendages on its cylindrical surface it can be readily installed in any suitable piston rod bearing, containing a piston rod seal.

The following description and references to the accompanying drawing will permit more fully understanding how a coaxial air-hydraulic cylinder can be constructed by the installation of my hydraulic control cylinder and air piston assembly in any cylindrical cavity of any material capable of sustaining pressure and having suitable end caps with ports for admitting and discharging air under pressure.

FIGURE 1 in the drawing is substantially a reproduction of the axial section of the hydraulic control cylinder disclosed in my copending application, Ser. No. 414,917. It is to be understood that numerical references up to 30 are identical with the numerical references called out in the original drawing of my copending application. Numerical references pertaining only to this disclosure are numbered 31 to 40, inclusive.

Figure 1:
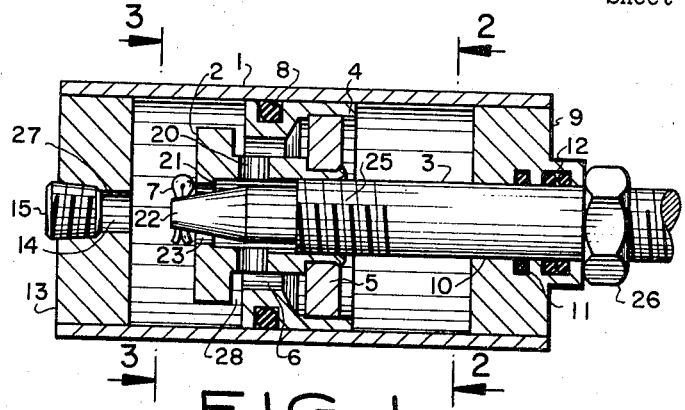
Figure 4:
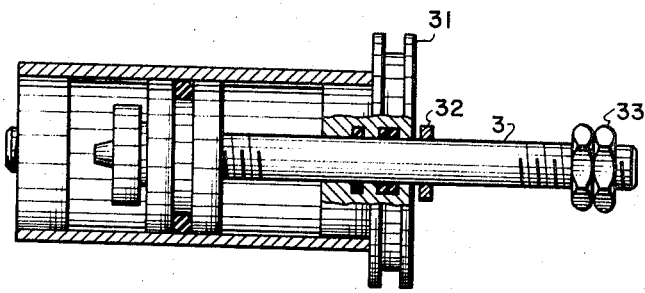

FIGURE 4 shows the same cylinder modified by substituting a grooved flange 31 for the projection 9 on the rod end cylinder cap in FIGURE 1. Control rod 3 has been extended to permit mounting thereon securely a positive mechanical stop 32 and an additional locknut 33. By installing a pressure seal in the groove the assembly constitutes an hydraulic control cylinder and air piston assembly.

It is to be understood that this substitution and modification is of the essence of my invention, which when installed in and in combination with any cylindrical cavity described above becomes the operating means of a coaxial air-hydraulic cylinder whose prime purpose is to provide infinitely adjustable controlled feed of the air cylinder piston rod.

Figure 5:
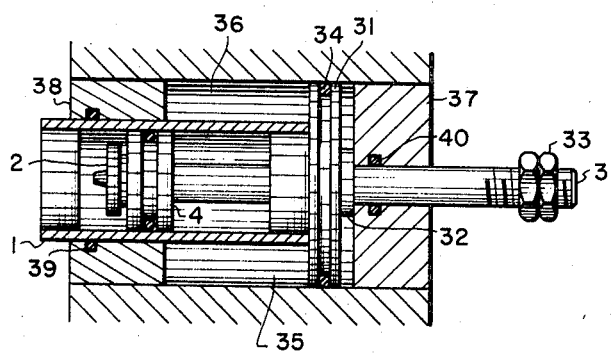

FIGURE 5 is an axial section through any cylindrical cavity having suitable end caps sealed against leakage with ports for admitting and discharging air under pressure containing a typical installation of FIGURE 4. In combination, the assembly constitutes a coaxial air-hydraulic cylinder.

Figure 6:
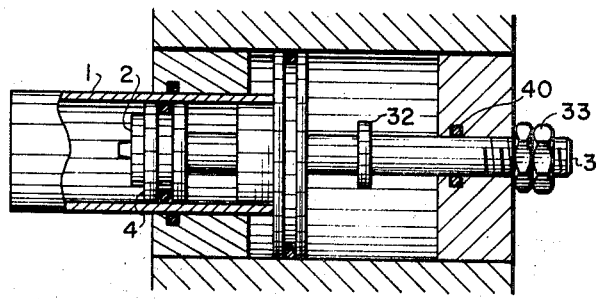

FIGURE 6 shows the same coaxial air-hydraulic cylinder assembly with the piston rod 1 (hydraulic control cylinder) partly extended.

FIGURE 1 is an axial section through a cylinder 1 containing a metering poppet 2 and a metering piston rod 3 assembled to poppet 2 by mating screw threads. Rod 3 is free to rotate on its axis by actuating externally during engagement with the female threaded portion of poppet 2. Poppet 2 is assembled to piston 4 and prevented from radial motion by retaining plate 5 although free to move axially sufficient to open or close annular orifice 6 which permits fluid passage through openings 19 in either direction. A cotter pin 7 prevents unscrewing rod 3 from poppet 2 unintentionally when in operation. A pressure seal 8 contained in a groove in piston 4 prevents fluid passage from one side of the piston to the other except through channels for that purpose.

Rod end cylinder cap 9 has a bearing surface 10 to act as a guide for rod 3 and is under continuous lubrication from the fluid in the rod side of piston 4. A pressure seal 11 installed in a groove in bearing surface 10 prevents loss of fluid past rod 3 and one or more pressure seals 12 spaced apart from seal 11 prevents entry of foreign matter and air from the outside. A nut 26 is attached to rod 3 to prevent overtravel on the return stroke.

Blind end cylinder cap 13 has a threaded hole 14 to permit pouring fluid through it into cylinder 1 and a mating threaded plug 15 to seal off this opening when the cylinder has been substantially filled with fluid.

Figure 2:
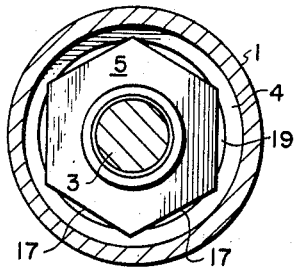
FIGURE 2 is a cross-sectional view of the cylinder of FIGURE 1 taken along lines 2—2.

FIGURE 2 is a section across cylinder 1 of FIGURE 1 looking in the direction of arrows 2—2 showing retaining plate 5 housed in slots 18 which are part of the periphery of hole 16 in piston 4, creating a number of openings 19 between the sides 17 of the retaining plate 5 and hole 16 through which fluid can flow in either direction.

Radial movement of plate 5 is prevented by being housed in slots 18 in piston 4 which piston is prevented from turning on its axis by the cross sectional squeeze of the highly frictional qualities of the pressure seal 8. Similarly, rod 3 is prevented from rotation about its axis by the cross sectional squeeze of seals 11 and 12, except by intentional external means.

Figure 3:
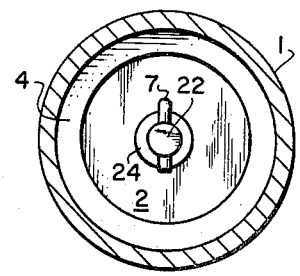
FIGURE 3 is a cross-sectional view of the cylinder of FIGURE 1 taken along lines 3—3.

When cylinder 1 is properly anchored, outward movement linearly of rod 3 extending through cap 9 will cause poppet 2 assembled to plate 5 to move with rod 3, closing annular opening 6 in piston 4 and carrying the piston in the direction of the rod movement. Fluid is then restricted to passage from the rod side of piston 4 through openings 19 into annular region 6 from where it is channeled through orifice 20 into annular orifice 21. At this point flow is metered into the opposite side of the piston by the interaction of cone 22 which is an integral part of rod 3 with hole 23 in poppet 2. The diameter of the base of cone 22 is a close precision fit with the diameter of hole 23, permitting entry of cone 22 into hole 23 to effect a complete shut off if desired. Threaded sections of poppet 2 and rod 3 permit gradual advance and retraction of cone 22 in hole 23 when rod 3 is rotated in engagement with the threaded portion of poppet 2 by external means. This arrangement permits infinitely varying the cross sectional area of the annular opening 24 in FIGURE 3 between cone 22 and hole 23, resulting in a means for infinitely adjusting flow regulation internally, and without by-pass tubes or needle valves externally.

Linear movement of rod 3 in the opposite direction will cause poppet 2 to move with it until plate 5 assembled to poppet 2 strikes the bottom of slots 18 causing piston 4 to move with poppet 2 and plate 5 as a unit. During the period of reverse linear motion, flow through piston 4 is unrestricted since poppet 2 has opened a relatively large gap 28 between poppet 2 and piston 4, permitting fluid to flow freely back into the rod side of the piston through the relatively large annular opening 6 connecting with openings 19.

The above hydraulic cylinder is utilized in combination with the air piston assembly shown in FIGURES 4–6. Thus, as shown in FIGURES 5 and 6, in operation, if there is a preset gap between the locknuts 33 and cap 37, pressure admitted through control rod end cap 37 causes the hydraulic control cylinder and air piston assembly of this disclosure to advance rapidly until locknuts 33 strike end cap 37. At the instant that locknuts 33 strike end cap 37, poppet valve 2 in the control cylinder 1 closes, arresting all forward motion of the poppet valve and control rod assembly. If the infinitely adjustable orifice 23 in the poppet valve 2 has not been shut off to flow, continued pressure against air piston 31 will cause oil to flow through the orifice 23 from the rod side of hydraulic piston 4, permitting the piston rod 1 assembled to air piston 31 to move forward while the poppet valve 2, hydraulic piston 4 and control rod 3 remain stationary. The rate of flow through the orifice 23 will determine the rate of forward advance of the piston rod 1 and air piston 31. If there is no preset gap on the control rod 3, hydraulic control of the piston rod 1 feed rate occurs instantly.

To start the return stroke of the hydraulic control cylinder and air piston assembly it is necessary to release the pressure in the control rod 3 side of air piston 31 and admit pressure to the piston rod side of air piston 31 through piston rod end cap 38. At that instant the cross sectional squeeze of seals 8, 11 and 12 being greater than seal 40 will cause control rod 3 to start moving through the control rod bearing and seal 40 in end cap 37 until positive mechanical stop 32 engages the inside face of end cap 37, forcing poppet 2 to open and freely allowing the entire flow control mechanism to be returned to its starting position while the piston rod 1 assembled to air piston 31 continues to move to the end of its stroke after control rod 3 has stopped moving.

At the end of the return stroke, pressure against air piston 31 forces it to apply pressure to positive mechanical stop 32 so that stop 32 securely attached to control rod 3 is radially locked in position between air piston 31 and end cap 37 preventing rotation of control rod 3 which would result in a change in feed rate. As disclosed in my copending application, turning the control rod 3 one way or other changes the flow through orifice 23 providing infinite adjustment of the feed rate.

To repeat the forward stroke, the pressurized annular column of air 36 in FIGURE 5 surrounding the piston rod 1 (hydraulic control cylinder) is quickly exhausted through the operating means to the atmosphere and a drop in temperature of the air occurs, carrying with it heat generated in the control cylinder 1 transferred by conduction to the surface of the control cylinder. Heat is generated when oil under pressure is forced through a small orifice 23. The annular column of air 36 in FIGURE 3 surrounding control cylinder 1 is in effect a heat exchanger which keeps the surface of the control cylinder 1 cooled, maintaining oil viscosity in the cylinder practically constant, making feed adjustments due to oil temperature rise unnecessary.

The basis for this heat exchanger operation is due to a principle in physics which states that when a gas under pressure is suddenly released to the atmosphere the expansion of the gas causes a drop in temperature. Exhaustive cycle testing of the hydraulic control cylinder and air piston assembly of this disclosure in a cavity such as described above has shown that the higher the pressure and the higher the cycling frequency the greater the cooling effect. At very low cycling frequencies, not enough internal friction is generated through the orifice 23 to start a rise in temperature.

During operation, control rod 3 is prevented from rotation on the forward stroke by the load imposed on locknuts 33 while the piston rod 1 and air piston 31 are moving forward as shown in FIGURE 6. Upon return to starting position, control rod 3 is prevented from rotation by the pressure lock on positive stop 32 previously described and shown in FIGURE 5 as long as pressure is maintained in the annular space 36. In making feed rate adjustments, pressure from the system is preferably released to permit easy rotation of the control rod 3.

These positive mechanical anti-rotation locks in conjunction with the operation of the above-described heat exchanger act to keep any selected feed rate of the piston rod 1 (hydraulic control cylinder) constant.

In FIGURE 5, 34 is the pressure seal in air piston 31, 35 is any cylindrical cavity in any material capable of sustaining pressure, 39 is the piston rod 1 bearing pressure seal, and 40 is the control rod 3 bearing pressure seal.

Based on the details of the above disclosure, I claim:

1. An hydraulic cylinder and air piston assembly comprising an air piston, an hydraulic cylinder, said hydraulic cylinder having one end thereof closed by said air piston and the other end thereof closed by an end wall, an hydraulic piston coaxial with said air piston and axially movable within said hydraulic cylinder, said hydraulic cylinder adapted to be filled with hydraulic fluid, hydraulic control means for controlling the flow of hydraulic fluid from one side of said hydraulic piston to the other side thereof, a piston rod connected to said hydraulic piston and extending in slidable relation through a bore in said air piston, said air piston and hydraulic cylinder being mounted coaxially within an air cylinder, said hydraulic piston being axially movable relative to said air piston and said air cylinder, limit stop means associated with said piston rod and said air cylinder, said limit stop means being operative to limit the axial travel of said relatively movable hydraulic piston, air input means for supplying air to a particular side of the air piston within the air cylinder, said hydraulic control means being a poppet valve in said hydraulic piston, said poppet valve allowing hydraulic fluid to pass through said hydraulic piston in a given direction only after the completion of travel of said hydraulic piston as determined by said limit stop means.

2. The hydraulic cylinder and air piston assembly of claim 1 wherein said limit stop means includes a locknut adjustably mounted on said piston rod to control the travel of said hydraulic piston.

3. The hydraulic cylinder and air piston assembly of claim 1 wherein said poppet valve has a variable orifice for controlling the flow of hydraulic fluid therethrough, said poppet valve variable orifice being controllable by rotation of said hydraulic piston rod.

References Cited

UNITED STATES PATENTS

| | | | |
|---|---|---|---|
| 2,410,992 | 11/1946 | Myklestad | 188—88.504 |
| 3,313,214 | 4/1967 | Ackerman | 92—8 |
| 2,342,729 | 2/1944 | Focht | 188—88.503 |
| 2,649,842 | 8/1953 | Caldwell et al. | 92—65 |
| 2,774,447 | 12/1956 | De Carbon | 188—88.501 |
| 2,930,072 | 3/1960 | Uebelhoer | 188—88.509 X |
| 2,950,785 | 8/1960 | Patriquin | 188—88.509 |
| 3,070,191 | 12/1962 | Allinquant | 188—88.501 |
| 3,149,541 | 9/1964 | Hutter et al. | 92—8 X |
| 3,200,596 | 8/1965 | Olson et al. | 92—12 X |

FOREIGN PATENTS

| | | |
|---|---|---|
| 1,006,219 | 4/1957 | Germany. |
| 939,064 | 2/1956 | Germany. |
| 708,582 | 5/1954 | Great Britain. |
| 821,319 | 10/1959 | Great Britain. |
| 548,272 | 9/1956 | Italy. |

MARTIN P. SCHWADRON, *Primary Examiner.*

IRVIN C. COHEN, *Assistant Examiner.*

U.S. Cl. X.R.

92—8